US011518895B2

(12) United States Patent
Graunke et al.

(10) Patent No.: US 11,518,895 B2
(45) Date of Patent: Dec. 6, 2022

(54) ENERGY CURED HEAT ACTIVATED INK JET ADHESIVES FOR FOILING APPLICATIONS

(71) Applicant: INX International Ink Co., Schaumburg, IL (US)

(72) Inventors: Jonathan Graunke, South Elgin, IL (US); Xiang Liu, Schaumburg, IL (US); Rick Westrom, Schaumburg, IL (US)

(73) Assignee: INX International Ink Co., Schaumburg, IL (US)

( * ) Notice: Subject to any disclaimer, the term of this patent is extended or adjusted under 35 U.S.C. 154(b) by 0 days.

(21) Appl. No.: 17/151,949

(22) Filed: Jan. 19, 2021

(65) Prior Publication Data

US 2021/0139719 A1 May 13, 2021

Related U.S. Application Data

(62) Division of application No. 16/018,875, filed on Jun. 26, 2018, now Pat. No. 10,927,269.

(60) Provisional application No. 62/525,507, filed on Jun. 27, 2017.

(51) Int. Cl.
| | | |
|---|---|---|
| *C08F 2/50* | (2006.01) | |
| *C08G 61/04* | (2006.01) | |
| *C09D 11/101* | (2014.01) | |
| *C09J 133/10* | (2006.01) | |
| *C09J 133/08* | (2006.01) | |
| *C09D 11/10* | (2014.01) | |
| *C09J 133/14* | (2006.01) | |

(52) U.S. Cl.
CPC ............ *C09D 11/101* (2013.01); *C09D 11/10* (2013.01); *C09J 133/08* (2013.01); *C09J 133/10* (2013.01); *C09J 133/14* (2013.01); *C08L 2312/00* (2013.01)

(58) Field of Classification Search
CPC ...... C09D 11/101; C09D 11/10; C09J 133/14; C09J 133/10; C09J 133/08; C08L 2312/00
USPC .................................................. 522/1; 520/1
See application file for complete search history.

(56) References Cited

U.S. PATENT DOCUMENTS

| | | |
|---|---|---|
| 6,395,120 B1 | 5/2002 | Bradburry-Harris et al. |
| 6,509,128 B1 | 1/2003 | Everaerts et al. |
| 6,624,273 B1 | 9/2003 | Everaerts et al. |
| 6,974,850 B2 | 12/2005 | McMan et al. |
| 7,067,584 B2 | 6/2006 | Rink et al. |
| 7,204,588 B2 | 4/2007 | Takabayashi |
| 7,507,776 B2 | 3/2009 | McMan et al. |
| 7,754,779 B2 | 7/2010 | Odell et al. |
| 7,959,279 B2 | 6/2011 | Nakamura |
| 8,133,551 B2 | 3/2012 | Claes |
| 9,346,303 B2 | 5/2016 | Grinberg et al. |
| 9,487,027 B1 | 11/2016 | Strater, Jr. et al. |
| 10,927,269 B2* | 2/2021 | Graunke ................ C09J 133/10 |
| 2002/0128340 A1 | 9/2002 | Young et al. |
| 2003/0054139 A1 | 3/2003 | Ylitalo et al. |
| 2007/0219285 A1 | 9/2007 | Kropp et al. |
| 2008/0299317 A1 | 12/2008 | Hable |
| 2009/0181182 A1 | 7/2009 | Sloan |
| 2010/0212821 A1 | 8/2010 | Grinberg et al. |
| 2010/0331478 A1 | 12/2010 | Claes |
| 2011/0223391 A1 | 9/2011 | Nishimura et al. |
| 2012/0070595 A1 | 3/2012 | Sloat et al. |
| 2013/0075040 A1 | 3/2013 | Grinberg et al. |
| 2014/0109828 A1 | 4/2014 | Grinberg |
| 2016/0137857 A1* | 5/2016 | Zhang ..................... B41M 1/40 522/18 |
| 2018/0163066 A1 | 6/2018 | Ward |
| 2018/0311997 A1 | 11/2018 | Triepel et al. |
| 2018/0319136 A1 | 11/2018 | Cohen et al. |
| 2020/0216691 A1 | 7/2020 | Gould |

FOREIGN PATENT DOCUMENTS

| | | |
|---|---|---|
| CN | 102199377 A | 9/2011 |
| EP | 0193726 A2 | 9/1986 |
| GB | 1590414 A1 | 6/1981 |
| JP | H05320582 A | 12/1993 |
| JP | 2002069388 A | 3/2002 |
| JP | 2003326846 A | 11/2003 |
| JP | 2008169319 A | 7/2008 |
| JP | 2009024139 A | 2/2009 |
| JP | 2009226880 A | 10/2009 |
| JP | 2014177023 A | 9/2014 |
| WO | 2002034521 A1 | 5/2002 |
| WO | 2011021052 A2 | 2/2011 |

OTHER PUBLICATIONS

International Search Report and Written Opinion for Application No. PCT/US2018/039505 dated Oct. 19, 2018 (17 pages).
International Preliminary Report on Patentability for Application No. PCT/US2018/039505 dated Jan. 9, 2020 (10 pages).
European Patent Office Extended Search Report for Application No. 18824065.9 dated Feb. 22, 2021 (10 pages).
Datta et al., "Conductive Adhesives From Low-VOC Silver Inks for Advanced Microelectronics Applications," in IEEE Transactions on Components, Packaging and Manufacturing Technology, vol. 1, No. 1, pp. 69-75, Jan. 2011.

(Continued)

*Primary Examiner* — Jessica Whiteley
(74) *Attorney, Agent, or Firm* — Michael Best & Friedrich LLP

(57) ABSTRACT

Adhesive compositions that can be applied to substrates using inkjet printheads and cured to a hardened, tack-free state and readily rendered tacky on application of heat and pressure to accurately transfer foil to the substrates including one or more free-radical curing monomers, an oligomer/resin composition component including one or more oligomers and one or more inert thermoplastic resins that are soluble in the monomers, and, where required, one or more free radical photoinitiators.

24 Claims, No Drawings

(56) References Cited

OTHER PUBLICATIONS

Japan Patent Office Office action for Application No. 2019-572528 dated Mar. 8, 2022, (13 pages with translation).

* cited by examiner

ENERGY CURED HEAT ACTIVATED INK JET ADHESIVES FOR FOILING APPLICATIONS

CROSS-REFERENCE TO RELATED APPLICATIONS

The present application is a divisional of and claims priority to U.S. patent application Ser. No. 16/018,875, filed on Jun. 26, 2018, which claims priority to U.S. Provisional Application No. 62/525,507, filed on Jun. 27, 2017, the entire contents of all of which are fully incorporated herein by reference.

FIELD OF THE INVENTION

Embodiments of the invention relate to an energy curable inkjet adhesive composition comprising inert resins, functional oligomers, monomers, and other additives. The adhesive can be applied to substrates including, inter alia, paper, carton board, plastic films and plastic sheets. Upon exposure to one of UV, LED, or electronic beam radiation, the adhesive is fully hardened and has a tack-free surface. The hardened adhesive surface will become tacky upon exposure to heat and pressure. When a foil is applied to the tacky surface of the hardened adhesive, die-less foil transfer can be efficiently and accurately implemented.

Cold Foiling

Cold foiling and hot foiling are commonly used in metallic foil decoration of various substrates. The basic steps involved in cold foiling are: (1) Apply adhesive to the substrate in a desired image configuration; and (2) Press together foil on a backing carrier and the substrate to release the foil from its backing carrier onto the substrate wherever the adhesive image configuration was printed and (3) strip away the foil from areas where no adhesive was printed.

Cold foil adhesives currently are available as solvent-based, water-based, oil-based and UV curable formulations. The cold foiling operation can be conducted through in-line processes such as an in-line offset process or an in-line flexo process. In recent years, inkjet printing has been used in foiling applications. UV curable inkjet adhesives have also been used in in-line cold foiling applications.

Because of the low viscosity requirements of ink jet printing processes, prior art adhesives jetted from inkjet nozzles do not typically have sufficiently high viscosity and tackiness when they reach and are deposited on the substrate. High viscosity and high surface tackiness properties, however, are essential for a foil to be transferred smoothly during the foiling process. Prior art approaches have applied UV curing dosages short of that needed to fully cure and harden the adhesive in order to manipulate adhesive viscosity and initiate the onset of adhesive tackiness. This substantially increases the complexity of the process and its expense. It also leads to subpar image formation due to lack of hardness in the adhesive layer when its surface is nipped to the foil.

Prior art adhesive image configurations are not fully cured and hardened after application to the substrate and therefore substrates bearing the jetted adhesive image configurations are difficult to store before foil application in either web or sheet form since they tend to stick to each other, and they tend to spread under pressure, then are very sensitive to moisture which may soften and degrade the images or render them undercured. Also, since prior art cured adhesive image configurations are not sufficiently hardened to resist spread and degradation when nipped under pressure to the foil, they often produce subpar foiled images. Additionally, many of such prior art systems require partially dried or partially cured and hardened adhesive image configurations to first be nipped to the foil and then fully cured and hardened which also produces subpar foiled images due to image spread prior to full hardening and curing and depositing of uncured or partially cured and hardened adhesive onto rollers and other system components.

The cold foiling process is carried out in-line with printing. This in-line process generally will not allow for indexing of foil and thus may bring about foil waste. Tacky, partially cured and incompletely hardened adhesive image configurations generally will not allow for indexing of foil and therefore will increase foil waste in such in line processes. When only small solid areas of the substrate receive the adhesive image configuration, excessive amounts of foil will be wasted without indexing the substrate.

Cold foiling cannot be conducted off-line with printing (e.g. by convertors) because the tackiness and softness of the adhesive image configuration applied to the substrate makes storage and transport of the substrate to a printing facility impractical and undesirable.

Hot Foiling

Hot foiling is another technique used in applying metallic foil decoration onto various substrates. Hot foiling, which is also referred to as hot stamping, is traditionally accomplished on a foil stamping machine that uses a metal plate/die that has been engraved with an image of the designed pattern.

The hot foil web material that can be used in this process is well known and widely available. It generally comprises a polyester or other plastic backing film with a wax layer, a lacquer layer, a foil layer and an adhesive layer lying over the foil layer. The adhesive layer lying over the foil layer is positioned opposite the adhesive image configuration laid down on the substrate to which the foil is to be applied.

In this process a heated plate/die strikes the back side of a roll or web of foil film, to activate a release layer and cause the foil to be transferred onto the area of the substrate which is to receive the foil. Hot foiling can be combined with embossing/debossing to produce a tactile effect.

According to this hot foiling technique, the foil pattern applied to the substrate is dictated by the design engraved into the metal die. It may take several days or even weeks to engrave a die with the required design, and to mount the die onto the printing unit ready for stamping the foil onto the substrate. The die engraving process is very expensive, and this is particularly true for short run jobs where each of the runs may need a new imaging design. High pressure and temperature are required and it is difficult to maintain proper registration and fine resolutions in hot foiling.

The unique adhesive composition embodiments of the present invention can be readily applied to substrates using inkjet printheads, fully cured to a hardened, tack-free, dry-to-the-touch and moisture resistant state and then, when desired, readily rendered tacky on application of heat and pressure to accurately transfer foil to the substrates. These unique adhesive composition embodiments thereby make convenient, efficient, precise and reliable dieless hot foiling techniques possible by using inkjet printheads to apply the adhesive in desired image configurations.

SUMMARY OF EMBODIMENTS OF THE INVENTION

Embodiments of the present invention address challenges in prior art cold foiling and hot stamping systems.

Embodiments of the invention comprise a foil printing system employing adhesive compositions applied to a substrate in a desired adhesive image configuration using the non-contact printing process of inkjet printing. The substrate may be paper, carton board, plastic film (e.g., polypropylene or polyethylene) and other materials used in non-contact printing processes in either web or sheet form.

After embodiments of the adhesive composition are applied to the substrate in the desired image configuration, the image is cured to a hardened, tack-free, dry-to-the-touch and moisture resistant state by exposure to UV or LED radiation, or by electron-beam ("EB") ionizing radiation. Application of the UV, LED, or EB radiation to the image nearly instantly transforms the adhesive composition from a liquid to a hardened tack-free solid at room temperature. No further curing of the hardened adhesive composition image configuration is required or occurs in this system.

Monomer Component

Adhesive composition embodiments of the invention have the unique characteristic of being able to fully cure and harden upon exposure to UV, LED or EB radiation yet soften along their exposed surface and take on sufficiently adhesive surface characteristics for proper foil transfer when heating and pressure are applied during the foiling process.

In order to achieve the unique characteristic of being able to fully cure and harden upon exposure to UV, LED or EB radiation yet soften along the exposed surface of the applied adhesive image and take on sufficiently adhesive surface characteristics for proper foil transfer upon application of heat and pressure, it is necessary that the monomer component of the composition be purely or primarily radiation-curable monofunctional monomers, that the level of any bifunctional or trifunctional monomers present be carefully limited, and that other multi-functional monomers (greater than trifunctional monomers) be excluded from the composition. More particularly, the level of bifunctional and/or trifunctional radiation-curable monomers must be no more than about 20% by weight of the monomer component of the composition and preferably no more than about 10% by weight of the monomer component, with the balance being one or more radiation-curable monofunctional monomers. Additionally, the low functionality free-radical curing monomer(s) must be able to solubilize the inert resin component of the composition, that is, the inert resin component must be soluble in the monomer.

Oligomer/Resin Component

This component of the composition may comprise exclusively one or more functional oligomers, exclusively one or more inert thermoplastic resins, or a combination of one or more functional oligomers and one or more inert thermoplastic resins. "Inert thermoplastic resins" are thermoplastic resins that do not polymerize when subjected to UV, LED or EB radiation. The inert thermoplastic resin(s) and oligomer(s) used may be up to 100% solids and desirably have a glass transition temperature $T_g$ of the oligomer(s) and resin(s) within 40% and preferably within 10% of the glass transition temperature of the low functionality free-radical curing monomer used. In less preferred embodiments inert thermoplastic resins and oligomers outside of this glass transition temperature may be used, so long as the $T_g$ of the final adhesive composition is in the range of about 20-100° C. and preferably about 40-80° C.

Additionally, in order to achieve unique hardening and ability to soften along the image surface, it is further required that the glass transition temperature $T_g$ of the oligomers and/or resins be about −45° to 250° C. and their softening point should be about 0° to 190° C. and preferably 60° to 120° C.

Free Radical Photoinitiator

A free radical photoinitiator is required to achieve free radical curing of the UV and LED cured compositions but is not required for the EB cured compositions.

One objective of embodiments of the invention is to provide adhesive composition embodiments that are curable by the application of EB curing technology and do not require the use of photoinitiators. EB cured adhesive compositions are preferred in many applications because they generally produce less odor than UV/LED cured compositions, can be used to generate thicker coatings and raised images, and produce superior visual quality images from transferred foil. EB curable heat activated adhesive embodiments are also particularly well-suited for use in food, pharmaceutical, and personal care packaging in both cold and hot foiling processes.

The photoinitiators used for UV curable adhesives should absorb radiation in the actinic wave bands (e.g., 220-410 nm) that are generated by conventional mercury UV lamps.

The photoinitiators used for LED curable adhesives should absorb the longer actinic wave bands (e.g., 395 nm, 365 nm) that are emitted by LED lamps.

Surface Tension and Viscosity of Adhesive Compositions

Preferably, embodiments of the adhesive compositions will have a surface tension at 25° C. from about 22 mN/m to 34 mN/m, preferably from about 25 mN/m to 32 mN/m, and more preferably from about 28 mN/m to 30 mN/m. Preferably, embodiments will also have a viscosity at 25° C. between about 5 cps and 200 cps, preferably between about 10 cps and 100 cps, and more preferably between 15 cps and 40 cps.

Embodiments of the UV curable and the LED curable inkjet heat activated adhesives comprise:
 (1) about 0-10% inert resins
 (2) about 0-10% low functionality oligomers
 (3) about 45-95% mono-functional monomers
 (4) about 0-10% difunctional monomers
 (5) about 0-10% trifunctional monomers
 (6) about 1-20% photoinitiators
 (7) about 0-20% amine synergists
 (8) about 0.01-2.5% defoamers
 (9) about 0.01-5.0% wetting, flow agents
 (10) about 0-3% wax additives
 (11) about 0.05-3.0% stabilizers Embodiments of EB curable inkjet heat activated adhesives comprise:
 (1) about 0-10% inert resins
 (2) about 0-10% low functionality oligomers
 (3) about 40-95% mono-functional monomers
 (4) about 0-10% difunctional monomers
 (5) about 0-10% trifunctional monomers
 (6) about 0-20% amine synergists
 (7) about 0.01-2.5% defoamers
 (8) about 0.01-5.0% wetting, flow agents
 (9) about 0-3% wax additives
 (10) about 0.05-3.0% stabilizers

DETAILED DESCRIPTION OF EMBODIMENTS

It is to be understood that the foregoing general description and the following detailed description are exemplary and explanatory only, and are not intended to restrict the subject matter claimed or protected herein.

Unless defined otherwise, all technical and scientific terms used herein have the same meaning as is commonly understood by one of skill in the art to which the inventions belong.

As used herein, "monomer" refers to a material having a viscosity less than that of an oligomer, molecular weight less than about 1000 g/mole and viscosity of 500 cps or less at 25° C. The monomers contain one or more unsaturated groups capable of polymerizing to form oligomers or polymers.

As used herein, the term "monofunctional acrylate monomer" refers to a monomer containing one functional acrylate group or one C=C double bond.

As used herein, the term "difunctional acrylate monomer" refers to a monomer containing two functional acrylate groups or two C=C double bonds.

As used herein, the term "trifunctional acrylate monomer" refers to a monomer containing three functional acrylate groups or three C=C double bonds.

As used herein, the term "high functionality acrylate monomer" refers to an acrylate monomer containing greater than three functional acrylate groups or three C=C double bonds.

As used herein, the terms "(meth) acrylate" and "(meth) acrylic acid" include both the acrylate compounds and methacrylate compounds.

As used herein, the term "ethoxylated" refers to chain extended compounds through the use of ethylene oxide.

As used herein, the term "propoxylated" refers to chain extended compounds through the use of propolyene oxide.

As used herein, the term "alkoxylated" refers to chain extended compounds using either or both ethylene oxide and propylene oxide.

As used herein, "oligomer" refers to a material having a viscosity greater than that of a monomer, a molecular weight of about 5000 g/mole to 200,000 g/mole and having one or more unsaturated groups, are capable of polymerizing to form polymers with higher molecular weight. "Functional oligomers" are oligomers as described above that will dissolve in the monomers employed in embodiments of the invention, will cure rapidly on application of UV, LED or EB radiation, are flexible after being cured, and provide tackiness when heated after being cured.

As used herein, the term "molecular weight" means number average molecular weight unless expressly noted otherwise.

As used herein, "polymer" refers to a macromolecule that has a molecular structure consisting chiefly or entirely of a large number of similar units bonded together.

As used herein, the term "inert resin" refers to a resin that contains no C=C bond or other reactive groups and which does not react with monomers/oligomers even if exposed to UV, LED, or EB radiation.

As used herein, the term "thermoplastic resin" refers to a plastic material, or a polymer, that becomes pliable or moldable above a specific temperature and solidifies upon cooling.

As used herein, "energy curable" refers to curing in response to exposure to suitable energy sources including ultraviolet (UV) radiation, light emitting diode (LED) radiation, and electron beam radiation.

As used herein, "cure" or "curing" refers to a process that leads to polymerizing, hardening and/or cross-linking of monomer and/or oligomer units to form a polymer.

As used herein, the term "room temperature" refers to an ambient temperature of 23° C. to 25° C.

As used herein, "heat activatible or heat activated" refers to an activity of a cured resin or cured adhesive in response to its exposure to heat and pressure.

As used herein, the term "coat weight" refers to amount of adhesive applied on a given side or surface of a substrate. This may be usually expressed in grams of the composition per square meter of the substrate ("gsm").

As used herein, the term "in-line" refers to a foiling system in which the printing station and the foiling station are separate commonly driven units horizontally mounted one to the other.

As used herein, the term "off-line" refers to a foiling system in which the printing station and foiling stations are separate units mounted in different locations or horizontally mounted one to the other which are not commonly driven or operated.

Throughout this disclosure, all parts and percentages are by weight (wt % based on total weight) and all temperatures are in degrees C. unless otherwise specified.

Inert Thermoplastic Resins

The resins used in adhesive composition embodiments are inert and that they do not react with monomers or oligomers in the composition embodiments. These carefully selected inert thermoplastic resins also contribute to film flexibility and reduce film shrinkage during the curing process, improve surface softening, tackiness and adhesion, and help the cured adhesive compositions firmly adhere to the substrate. Thermosetting resins may not be used.

The inert thermoplastic resins may be selected from among rosin ester resins, cellulose resins, polyester resins, aldehyde resins, epoxy resins, acrylic resins, methacrylic resins, acrylate resins, methacrylate resins, urea aldehyde resins, vinyl chloride copolymers, melamine-formaldehyde resins, polyurethane resins, polyimide resins, alkyd resins, and phthalate resins. Methacrylic resins are currently preferred. The inert resins must have a molecular weight in the range of about 800 g/mole to 200,000 g/mole, and preferably in the range of about 10,000 g/mole to 60,000 g/mole.

Acrylic, methacrylic, acrylate and methacrylate resins that may be used include Paraloid DM-55 (methyl methacrylate copolymer with a molecular weight of 6,000, Tg 70° C.), Paraliod B44 (MMA/EA copolymer with a molecular weight of 140,000, Tg 60° C.) from Dow, Elvacite 4036 (Ineos acrylics with a molecular weight of 60,000, Tg 50° C.), Elvacite 2046 (iso-butyl/n-butyl methacrylate copolymerc with a molecular weight of 165,000, Tg 35° C.), Elvacite 2013 (methyl methacrylate/n-butyl methacrylate copolymer with a molecular weight of 34,000, Tg 76° C.), Elvacite 2043 (ethyl methacrylate copolymer with a molecular weight of 50,000, Tg 66° C.) from Lucite, NeoCryl B735 (methyl methacrylate copolymer with a molecular weight of 40,000, Tg 74° C.), NeoCryl B300 (MMA/BMA copolymer with a molecular weight of 16,000, Tg 45° C.), and NeoCryl B302 (MMA copolymer with a molecular weight of 5,000, Tg 80° C.) from DMS, Dianal BR 106 (n-butyl methacrylate copolymer with a molecular weight of 60,000, Tg 60° C.) from DAI, Degalan 64/12 (acrylic resin with a molecular weight of 68,000, Tg 58° C.) from Evonic, Ebecryl 168 (acidic methacrylate copolymer, Mt and Tg unspecified), Ebecryl 170 (acidic methacrylate copolymer, Mt and Tg unspecified), Ebecryl 745 (acrylic polymer, Mt unspecified Tg 30° C.) from Allnex, and LUMICRYL 1000 (acrylic resin, Mt and Tg unspecified) from Estron Chemical.

Aldehyde resins that may be used include Laropal A 81 (aldehyde resin, Mt unspecified, Tg 57) Laropal A 101 (aldehyde resin, Mt unspecified,Tg 73) from BASF, and SK resin (a hydrogenated acetophenone-folmaldehyde resin having a Tg of 90° C.) from Evonic.

Vinyl resins that may be used include Vinnol E15/48H (hydroxyl-containing copolymer of approx. 84 wt. % vinyl chloride (VC) and approx. 16 wt. % of acrylic acid esters) from Wacker, ELVAX 150 (ethylene vinyl acetate copolymer, melting point 63° C.), ELVAX 40L-03 (ethylene vinyl acetate copolymer, melting point 58° C.), ELVAX CE9619-1 (ethylene vinyl acetate copolymer, melting point 87° C.) from DuPont, and VYHH (with a molecular weight of 27,000, Tg 72° C.), VMCC (with a molecular weight of 19,000, Tg 72° C.), VWCH (with a molecular weight of 27,000, Tg 74° C.) from Dow.

Rosin ester resins that may be used include Syvatec RE 40 (Mt and Tg unspecified) from Arizona Chemical, and Filtrez 526 (fumaric acid modified rosin ester, Mt unspecified, Tg 72° C.), Filtrez 629 (phenolic modified rosin ester, Mt unspecified, melting point 155° C.) from Akzo.

Polyester resins that may be used include CN-790 (Tg 55) from Sartomer, and SAIB100 (sucrose acetate isobutyrate with a molecular weight 856) from Eastman.

Cellulose-based resins that may be used include CAB551-0.01 (Cellulose Acetate Butyrate, with a molecular weight of 16,000, Tg 85° C.) from Eastman.

Hydrocarbon resins that may be used include Norsolene S135 (inert aromatic hydrocarbon resin, Tg 81.7° C.), Norsolene S125 (inert aromatic hydrocarbon resin, Tg 71.1° C., Norsolene S105 (inert aromatic hydrocarbon resin, Tg 53.5° C.), Norsolene S95 (inert aromatic hydrocarbon resin, Tg 46.3° C.), Norsolene S85 (inert aromatic hydrocarbon resin, Tg 45° C.), Norsolene A90 (inert aromatic hydrocarbon resin, Tg 46.4° C.), Wingtack 86 (inert aromatic hydrocarbon resin, Tg 52° C.), Wingtack 98 (aliphatic C-5 hydrocarbon resin, Tg 48) from Cray Valley, and NEVTAC 100 (C5 aliphatic hydrocarbon resin, molecular weight 2850) from Neville Chemical.

A single thermoplastic resin or a combination of two or more thermoplastic resins can be used in embodiments. In many applications the use of two or more different thermoplastic resins is preferred.

The level of inert resin in the oligomer/resin component of adhesive composition embodiments will be 0 to 100%, and preferably about 50% to 100% by weight, with the balance of the resin/oligomer component as oligomer and preferably in an amount of about 80-100% by weight. The total by weight of inert resin present in the adhesive composition will be about 0 to 10%, preferably about 1 to 8%, or more preferably about 2 to 6%.

Preferred inert thermoplastic resins are thermoplastic resins will have a glass transaction temperature (Tg) of about −20° C. to 250° C., preferably about 10° C. to 100° C., or more preferably about 20° C. to 90° C., and a molecular weight of 800 to 200,000 g/mole, preferably about 7,000 to 80,000 g/mole, or more preferably about 10,000 to 60,000 g/mole.

Paraliod B44 (a solid grade acrylic resin (MMA Copolymer) having a Tg of 60° C.), Elvacite 2013 (a solid grade methacrylate resin having a Tg of 76° C.), Dianal BR 106 (a solid grade methacrylate resin having a Tg of 58° C.), Laropal A 81(an aldehyde-ketone resin having a Tg of 73° C.), and SK resin (a hydrogenated acetophenone-folmaldehyde resin having a Tg of 90° C.) are currently preferred inert thermoplastic resins.

Oligomers

One or more functional oligomers may be used. The oligomers included in embodiments of the adhesive composition will be selected from epoxy (meth)acrylate, polyester (meth)acrylate, polyether (meth)acrylate, and polyurethane (meth)acrylate.

The oligomers should have a molecular weight less than about 100,000 g/mole and a viscosity of less than about 100,000 cps at room temperature. Yet more preferred oligomers are mono-functional polyurethane acrylates having molecular weights of less than about 75000 g/mole and viscosities of less than about 50000 cps at room temperature. Other preferred oligomers are mono-functional polyurethane acrylates having molecular weight of less than about 10000 g/mole and viscosity of less than about 10000 cps at room temperature.

The oligomers may be a single type of acrylate resin or a combination of two or more types of acrylate resin. The oligomers may have a glass transaction temperature (Tg) of about −45° C. to about 175° C., preferably about 10° C. to 100° C., or more preferably about 20° C. to 80° C.

An example of epoxy (meth)acrylates that could be used include Ebecryl 3702 (a fatty acid modified bisphenol A epoxy diacrylate, Tg 56° C.), Ebecryl 3703 (an amine modified bisphenol A epoxy diacrylate, Tg 57° C.), Ebecryl 3720 (a bisphenol A epoxy diacrylate, Tg 67° C.), Ebecryl 3721 (a modified bisphenol A epoxy diacrylate resin) from Allnex.

An example of polyester (meth)acrylates that could be used include CN-299 (tetrafunctional acrylated polyester oligomer, Tg 15° C.) from Sartomer, Genorad 40 (a methacrylated phosphate ester, Tg unspecified) from Nahn, Ebecryl 83 (an amine modified polyether acrylate,Tg 6° C.), Ebecryl 436 (a reactive chlorinated polyester resin diluted 40% with the reactive diluent trimethylolpropane triacrylate, Tg 54° C.), Ebecryl 438 (a reactive chlorinated polyester resin diluted 40% with the reactive diluent OTA-480, Tg 37), Ebecryl 450 (Fatty Acid Modified Polyester Hexaacrylate, Tg 17° C.), Ebecryl 452 (a low viscosity polyester acrylate oligomer, Tg unspecified), Ebecryl 810 (a polyester tetraacrylate, Tg 31° C.), Ebecryl 812 (low viscosity polyester acrylate, Tg 72), Ebecryl 820 (a low viscosity polyester acrylate, Tg unspecified), Ebecryl 870 (a fatty acid modified polyester hexaacrylate, Tg 41° C.), Ebecryl 4744 (a polyester acrylate, Tg 23° C.) and Ebecryl 5849 (a bio-based polyester acrylate, Tg 84) from Allnex.

An example of polyether (meth) acrylates that could be used include Ebecryl 80 (an amine modified polyether tetraacrylate, Tg 50° C.), Ebecryl 81 (an amine modified polyester acrylate, Tg −18° C.) and Ebecryl 85 (a low viscosity amine modified polyether acrylate, Tg unspecified) from Allnex.

An example of polyurethane (meth)acrylates that could be used include CN-131 (aroniatic monoacrylate oligomer, Tg 4° C.) from Sartomer, Geneomer 4188/M22 (a monofunctional urethane acrylate in 35% monomer IBOA, Tg −3° C.) from Nahn, Ebecryl 271 (a difunctional aliphatic urethane acrylate, Tg 19° C.), Ebecryl 242 (an aliphatic urethane acrylate oligomer diluted 30% by weight with the reactive diluent IBOA, Tg 46° C.), Ebecryl 1291 (a hexafunctional aliphatic urethane acrylate, Tg 80° C.), Ebecryl 4100 (an aliphatic urethane triacrylate, Tg 22° C.), Ebecryl 4200 (aliphatic urethane acrylate, Tg 12), Ebecryl 5129 (a hexafunctional aliphatic urethane acrylate,Tg 30° C.), Ebecryl 8210 (an aliphatic urethane acrylate, Tg 68° C.), Ebecryl 8296 (aliphatic urethane acrylate, Tg −1° C.), Ebecryl 8402 (aliphatic urethane diacrylate, Tg 14° C.), Ebecryl 8411 (aliphatic urethane diacrylate diluted 20% by weight with the reactive diluent isobornyl acrylate, Tg-18° C.), Ebecryl 8465 (aliphatic urethane triacrylate oligomer, Tg 36° C.), Ebecryl 8604 (an aliphatic urethane tetraacrylate, Tg 79° C.), Ebecryl 220 (a hexafunctional aromatic urethane acrylate, Tg 49° C.), Ebecryl 4500 (an aromatic urethane acrylate, Tg 9° C.) and Ebecryl 4849 (an aromatic urethane diacrylate diluted 15% by weight with the reactive diluent 1,6-hexanediol diacrylate (HDDA), Tg 29° C.) from Allnex.

The total functional oligomer present in adhesive composition embodiments should be at the level of 0 to 10%, preferably about 1% to 8%, or more preferably about 2% to 6%, based on the weight of the adhesive composition.

Geneomer 4188 (a monofunctional urethane acrylate diluted in monomer IBOA and have a Tg of −3° C.), Ebecryl 242 (an aliphatic urethane acrylate oligomer diluted in monomer IBOA and having a Tg of 46° C.), and CN 131 (aromatic monoacrylate oligomer having a Tg of 4° C.) are examples of currently preferred oligomers.

Mono-Functional Monomers

The mono-functional monomers should contain one functional acrylate group or one C═C double bond. Examples of mono-functional monomers that may be used include aliphatic mono (meth)acrylate, aromatic mono (meth)acrylate, alkoxylated (meth)acrylate, tetrahydrofurfuryl (meth)acrylate, alkoxylated tetrahydrofurfuryl (meth)acrylate, monoacrylic, N-vinyl compound, and acrylamide compound. They are available from suppliers such as Sartomer, Allnex, BASF, and Rahn, for example:

(1) Laromer TBCH from BASF is a t-butyl cyclohexyl acrylate (Mt. 210, Tg 84° C., viscosity 8 cps, surface tension 28.5)
(2) SR203 from Sartomer is a tetrahydro furfuryl methacrylate (Mt.170, viscosity 5 cps, surface tension: 35)
(3) SR285 T from Sartomer is an tetrahydro furfuryl acrylate (Mt. 156, Tg −15° C., viscosity 6 cps, surface tension: 36)
(4) SR257 from Sartomer is a stearyl acrylate (Mt. 314, Tg 35, viscosity 3 cps, surface tension: 30.9)
(5) SR324 from Sartomer is a stearyl methacrylate (Mt. 339, Tg 38° C., viscosity 14 cps, surface tension: 30.6)
(6) SR339 from Sartomer is a 2-phenoxyethyl acrylate (Mt. 192, Tg 5° C., viscosity 12 cps, surface tension: 39)
(7) SR340 from Sartomer is a 2-phenoxyethyl methacrylate, (Mt. 206, Tg 54° C., viscosity 10 cps surface tension 38)
(8) SR420 from Sartomer is 3,3,5 trimethyl cycohexyl acrylate, (Mt. 196, Tg 29° C., viscosity 6 cps, surface tension 27)
(9) CD421A from Sartomer is a 3,3,5-trimethylcyclohexyl methacrylate (Mt 210. Tg 145° C.)
(10) SR531 from Sartomer is a cyclic trimethylolpropane formal acrylate (Mt. 200, Tg 10° C., viscosity 15 cps, surface tension 33)
(11) SR423A from Sartomer is an isobornyl methacrylate (Mt. 222, Tg 110° C., viscosity 10 cps, surface tension 31)
(12) SR506 from Sartomer is isobornyl acrylate (Mt. 208, Tg 88° C., viscosity 8 cps, surface tension 32)
(13) 4HBA from BASF is 4-Hydroxybutyl Acrylate (Mt. 144, Tg −40° C., viscosity 11 cps, surface tension 35)
(14) ACMO from K J Chemicals (Japan) is a N-acryloyl morpholine (Mt. 141, Tg 145° C., viscosity 12 cps, surface tension 45)
(15) NVC from BASF is a N-vinyl caprolactam (Mt. 139, Tg 147° C., viscosity 5 cps, surface tension 43.9)
(16) NVP from BASF is a N-vinyl pyrrolidone (Mt. 111, Tg 150° C., viscosity 2.5 cps, surface tension 32.5)
(17) DMAC from Eastman is a Dimethylacetamide (Mt. 87.2, MP 14° C., viscosity 2.5 cps, surface tension 32)
(18) DAAM from Nippon Kasei is a diacetone acrylamide is (Mt. 229, Tg 77° C., viscosity 18 cps, surface tension 30.6)

Difunctional Monomers

When difunctional monomers are used they should contain two functional acrylate groups or two C═C double bonds. Adhesive embodiments containing these difunctional monomers generally cure faster than adhesive embodiments that contain only mono-functional monomers. Examples of difunctional monomers that may be used include aliphatic di-(meth) acrylate, aromatic di-(meth)acrylate, alkoxylated aliphatic di-(meth)acrylate, alkoxylated aromatic di-(meth) acrylate, glycol di-(methac)acrylate, cyclohexane dimethanol di-(meth)acrylate. They are available from suppliers such as Sartomer, Allnex, BASF, and Rahn, for example:

(1) CD564 alkoxylated hexanediol diacrylate, Mt. 401, viscosity 25 cps, surface tension 33, Tg 14° C.
(2) PRO1131, propoxylated neopentyl glycol diacrylate, viscosity 15 cps, surface tension 32, Tg 32° C.
(3) SR213, 1,4-butanediol diacrylate, Mt. 198, viscosity 8 cps, surface tension 36, Tg 45° C.
(4) SR214, 1,4-butanediol dimethacrylate, Mt. 226, viscosity 7 cps, surface tension 34, Tg 55° C.
(5) SR230, diethylene glycol diacrylate, Mt. 214, viscosity 12 cps, surface tension 38, Tg 100° C.
(6) SR231 diethylene glycol dimethacrylate, Mt. 242, viscosity 8 cps, surface tension 35, Tg 66° C.
(7) SR238b 1,6 hexanediol diacrylate, Mt 118, viscosity 9 cps, surface tension 36, Tg 43° C.
(8) SR239 1,6 hexanediol dimethacrylate, Mt.254, viscosity 8 cps, surface tension 34, Tg 30° C.
(9) SR247 neopentyl glycol diacrylate, Mt.212, viscosity 10 cps, surface tension 33, Tg 107° C.
(10) SR272 triethylene glycol diacrylate, Mt.259, viscosity 15 cps, surface tension 39, Tg 48° C.
(11) SR297 1,3-butylene glycol dimethacrylate, mt.226, viscosity 7 cps, surface tension 32, Tg 85° C.
(12) SR306F tripropylene glycol diacrylate, Mt 300, viscosity 15 cps, surface tension 33, Tg 62° C.
(13) SR349 ethoxylated (3) bisphenol a diacrylate, Mt 469, viscosity 1600 cps, surface tension 44, Tg 67° C.
(14) SR508 dipropylene glycol diacrylate, Mt 242, viscosity 10 cps, surface tension 33, Tg 104° C.
(15) SR540 ethoxylated (4) bisphenol a dimethacrylate, Mt 541, viscosity 555 cps, surface tension 35, Tg 108° C.
(16) SR541 ethoxylated (6) bisphenol a dimethacrylate, Mt 629, viscosity 440 cps, surface tension 35, Tg 54° C.
(17) SR601 ethoxylated (4) bisphenol a diacrylate, Mt 513, viscosity 1080 cps, surface tension 37, Tg 60° C.
(18) SR602 ethoxylated (10) bisphenol a diacrylate, Mt 777, viscosity 610 cps, surface tension 38, Tg 2° C.
(19) SR833S tricyclodecane dimethanol diacrylate, Mt 304, viscosity 130 cps, surface tension 38, Tg 186° C.
(20) SR9003B propoxylated (2) neopentyl glycol diacrylate, Mt 212, viscosity 15 cps, surface tension 32, Tg 32° C.
(21) SR9209a alkoxylated aliphatic diacrylate, viscosity 15 cPs, surface tension 35, Tg 48° C.

Trifunctional Monomers

When present, the trifunctional monomers contain three functional acrylate groups or three C═C double bonds. Adhesive embodiments containing trifunctional monomers generally cure faster than adhesive embodiments that contain only difunctional monomers. Examples of trifunctional monomers that may be used include:
(1) SR350 trimethylolpropane trimethacrylate, Mt.338, viscosity 44 cps, surface tension 34, Tg 27° C.
(2) SR351H trimethylolpropane triacrylate, Mt.296, viscosity 106 cps, surface tension 36, Tg 62° C.
(3) SR368D tris (2-hydroxy ethyl) isocyanurate triacrylate, Mt 375, viscosity 330 cps, surface tension 37, Tg 61° C.
(4) SR444 pentaerythritol triacrylate, Mt 298, viscosity 520 cps, surface tension 39, Tg 103° C.
(5) SR454 ethoxylated (3) trimethylolpropane triacrylate, Mt. 429, viscosity 110 cps, surface tension 40, Tg 103° C.
(6) SR501 propoxylated (6) trimethylolpropane triacrylate, Mt. 645, viscosity 125 cps, surface tension 33, Tg 21° C.
(7) SR9020 propoxylated (3) glyceryl triacrylate, Mt. 422, viscosity 95 cps, surface tension 36, Tg 18° C.

The monomers used in embodiments of the adhesive composition should have molecular weights less than about 1000 g/mole and viscosities less than about 100 cps, preferably molecular weights less than about 500 g/mole and viscosities lower than about 50 cps, and more preferably having molecular weights less than about 250 g/mole and viscosities less than about 20 cps.

The monomers also should have a surface tension of 26-43 dyne/cm, preferably a surface tension of 26-36 dyne/cm, and more preferably a surface tension of 26-32 dyne/cm.

Finally, the monomers should have a glass transition temperature (Tg), after being polymerized, of about −20° C. to 175° C., preferably about 10° C. to 100° C., and more preferably about 20° C. to 90° C.

The total level of monomer(s) used in embodiments of the adhesive composition should be in the range of about 45 to 95%, and more preferably in the range of about 60% to 80% based on the weight of the adhesive composition.

Monomers used in embodiments of the adhesive composition may comprise 100% mono-functional monomers. Isobornyl acrylate such as SR506 from Sartomer (Mt. 208, Tg 88° C., viscosity 8 cps, surface tension 32) has been found to be a particularly preferred mono-functional monomer in terms of curing speed, adhesion, and foil transfer quality. T-butyl cyclohexyl acrylate such as Laromer TBCH from BASF (Mt. 210, Tg 84° C., viscosity 8 cps, surface tension 28.5), is another particularly preferred mono-functional monomer in terms of curing speed, adhesion, and foil transfer quality.

The monomers used in embodiments may also comprise vinyl-containing monomers or acrylamide monomers, such as N-vinyl caprolactam (Mt. 139, Tg 147° C. viscosity 5 cPs, surface tension 43.9), N-vinyl pyrrolidone (Mt. 111, Tg 150° C., viscosity 2.5 cps, surface tension 32.5), diacetone acrylamide (Mt. 229, Tg 77° C., viscosity 18 cps, surface tension 30.6), in a loading of less than 25%, preferably less than 15%, and more preferably less than 10% of total monomer composition may be included to increase the curing speed and improve surface properties of cured film.

In some cases, up to 20% by weight and preferably no more than 10% by weight of di- or tri-function monomer (e.g., SR-833, tricyclodecane dimethanol diacrylate and SR-454, ethoxylated trimethylolpropane triacrylate (from Sartomer), VEEA 2-(2-Vinyloxyethoxy)ethyl acrylate (from Nippon Shokubai) may be incorporated in adhesive composition embodiments.

It is an unexpected discovery in embodiments of the invention that the exclusion of multi-functional monomers or, less preferably, limiting the level of multi-functional monomers to difunctional and trifunctional monomers at a level of no more than 20% and preferably no more than 10% of the total monomer component of the composition and excluding higher functional monomers produce good curing speed and desirable printed image properties. This discovery is at odds with conventional, currently accepted adhesive, ink, and coating products which typically may use high functionality monomers to achieve desired rapid curing speed.

Other Composition Ingredients

Other ingredients that are included in embodiments of the present invention generally include photo-initiators (for UV and LED curable compositions), synergists, stabilizers, wetting/flow agents, de-foamers, and wax compounds.

Photoinitiators

Photoinitiators initiate free-radical photopolymerization during UV or LED curing. Both Type 1 (cleavage) and Type 2 (H abstraction) photoinitiators may be used. EB curable adhesive compositions do not require the use of photoinitiators.

UV and LED curable inkjet compositions may contain one of more photoinitiators. Examples of photoinitiators that can be applied to UV and LED curable adhesive compositions include, but are not limited to, benzophenone, benzoin ether and their derivatives. These include benzophenone, chloro-benzophenone, 4-phenylbenzophenone, trimethylbenzophenone, 3,3'-dimethyl-4-methoxybenzophenone, benzoin methyl ether, benzoin ethyl ether, benzoin phenyl ether, and alkylbenzoins, such as methylbenzoin, ethylbenzoin, and propylbenzoin. These photoinitiators are available as Omnirad BP, Omnirad 4MBZ, Omnirad 4PBZ, Omnirad OMBB, Omnirad 4HBL, Omnirad BEM, Omnirad EMK, Omnirad MBF, and Omnirad BDK from IGM. Other photoinitiators that may be used include a-hydroxy ketone such as 1-hydroxy-cyclohexyl-phenyl ketone, 2-hydroxy-2-methyl-1-phenylpropanone, and 2-hydroxy-2-methyl-1-(4-isopropylphenyl) propanone. These photoinitiators are available products as Omnirad 73, Omnirad 481 from IGM. Still other photoinitiators that may be used include a-amino ketone and its derivatives, which are commercially available products include Irgacure 369, 907, 1300 from IGM, thioxanthone and its derivatives including thioxanthone, isopropyl-thioxanthone, 2-chloro and 2-ethyl-thioxanthone which are commercially available products include Omnirad ITX and Omnirad DETX from IGM, and acyl phosphine and its derivatives which are commercially available as products include Omnirad TPO, Omnirad TPO-L, and Omnirad 380 from IGM.

Photoinitiators that are also suitable for the use in UV and LED curable, adhesive composition are polymeric benzophenone derivatives, polymeric aminobenzoates, polymeric thioxanthone derivatives, polymeric a-hydroxy ketone. Commercially available, such products include the polymeric benzophenone derivatives GENOPOL BP-1 from Rahn and Omnipol BP from IGM, the polymeric aminobenzoates GENOPOL AB-1 from Rahn and Omnipol ASA from IGM, the polymeric thioxanthone derivatives GENOPOL TX-1 from Rahn and Omnipol TX from IGM, and the polymeric a-hydroxy ketone Chivacure 150 and 70 from Chitec.

The photoinitiators used in UV curable and adhesive embodiments absorb a wide range of actinic wave bands that are generated by conventional mercury UV lamp (e.g., from 220 nm to 410 nm). The photoinitiators used in LED curable adhesive embodiments absorb the longer actinic wave bands that are emitted by LED lamps (e.g., 395 nm, 365 nm).

The amount of photoinitiator present in the adhesive should be generally less than 20% based on the weight of the adhesive composition, but may be less than 15%, less than 10%, or between 5-10%, based on the weight of the adhesive composition. A level of about 10-15% is currently preferred.

Currently, the Omnirad 481(1-hydroxycyclohexyl-phenyl ketone) and Omnirad ITX (2-isopropyl thioxanthone) from IGM are more preferred photoinitiators for the UV curable, heat activated inkjet adhesive for hot foil application.

Irgacure 907 (2-methyl-1[4-(methylthio)phenyl]-2-morpholinopropan-1-one), Omnirad ITX(2-isopropyl thioxanthone) Irgacure 819 (bis(2,4,6-trimethylbenzoyl)-phenylphosphineoxide), Irgacure 369 (2-benzyl-2-(dimethylamino)-4'-morpholinobutyrophenone) and the Omnirad TPO (2,4,6-Trimethylbenzoyldiphenylphosphine oxide) from IGM are preferred photoinitiators for UV curable, heat activated inkjet adhesive for hot foil application.

Synergists

Preferably a synergist is included in composition embodiments to reduce the oxygen inhibition during photopolymerization and thus improve the curing speed. A free amine synergist may be included. Suitable examples free amine synergists include, but are not limited to, triethanolamine, N-methyldiethanolamine, N,N-dimethylethanolamine, 2-(dimethylamino)ethylbenzoate, ethyl-4-(dimethylamino) benzoate; 2-ethylhexyl-4-(dimethylamino)benzoate. Monofunctional amine and acrylate amine synergist are currently the more preferred synergists. Examples of these are monofunctional amine EHA from IGM, CN3175 from Sartomer or GENOPOL AB-1 from Rahn.

An acrylate amine synergist or a polymeric amine synergist may also be included in the adhesive formulation. Commercially available acrylate amine synergist products include Ebecryl 7100, Ebecryl 115 and Ebecryl p116 from Allnex; CN374, CN381, CN-1002, CN3705, CN3715, CN3735, CN3755 from Sartomer; Laromer PO 94F, Laromer PO77F from BASF. Commercially available polymeric amine synergist products include Omnipol ASA, Omnipol SZ from IGM, and GENOPOL AB-1 from Rahn.

The synergists preferably are incorporated into the adhesive compositions at a loading by weight of 0 to 20%, or preferably 2% to 15%, or more preferably 3% to 10%, based on the weight of the adhesive composition.

Stabilizers/Polymerization Inhibitors

Adhesive composition embodiments include one or more polymerization inhibitors or stabilizers to help prevent the adhesive from agglomerating and conventional gelling during production, storage, and transportation, and reduce/eliminate surface cracking of the cured composition. Examples of suitable inhibitors include phenolic materials (e.g., benzoquinone, hydroquinone, hydroquinone monomethyl ether, butylated hydroxytoluene), phenothiazines, nitrosophenyl hydroxylamine aluminium salts, benzotriazolealuminium salt amine complexes, aromatic ammine, nitroxyl compounds.

Currently preferred stabilizers/polymerization inhibitors include Generlad-16 (proprietary inhibitor in acrylic acid ester) at a level of about 0.05% to 3.0% preferably at a level of about 0.1% to 2.0% and most preferably at a level of about 0.2% to 1.0%.

Wetting/Flow Agents

Conventional wetting/flow agents can be included in adhesive compositions to modify surface tension and control the flow/levelling properties to ensure that the substrate wets properly and the adhesive flows and levels properly when applied. The wetting/flow agents may be silicone-free types (e.g., acrylate polymer) or silicone-containing types (e.g., polyether modified polydimethylsiloxane). The level of wetting/flow agents (e.g., Radadd 1116 from the Trilogy Group, Ebecryl 1360 from Byk) will vary depending on the particular agents used but generally will be present at a level of at least about 0.1% and no more than about 5% based on the weight of the adhesive composition.

De-Aerators/Defoamers

Conventional foam mitigating or foam destroying materials may be included in embodiments of the adhesive composition as a de-aerator, and/or a deformer. Defoaming agents are generally included to limit the formation of macrofoam at the surface of a liquid. Deaerating agents are generally included to speed removal of air that has been mixed into the coating film during application as quickly as possible. Examples of these materials include polyacrylates, polyglycols, polyols, polysiloxanes, oxyalkylene amines, silicone oils and fluids, and polyether modified methylalkyl polysiloxane copolymers and combinations thereof.

Examples of de-aerators that can be used include TEGO 910 (silicone free polymer) TEGO 920 (silicone-free air release additive), TEGO 900 (organo-modified polysiloxane) available from Evonik, and Byk-500 (silicone-free air release additive) available from Byk.

Examples of defoamers that can be used include TEGO Foamex N (Dimethyl polysiloxane), the TEGO 810 (polyether siloxane copolymer), the TEGO 845 (organo-modified polysiloxane)from Evonik, the Byk-535(silicone-free polymer), the BYK-055 (Silicone-free solution of foam destroying polymer), the Byk-1790 (silicone-free, polymer-based defoamer), BYK-1791 (silicone-free, aromatic-free, polymer-based defoamer) from BYK, the Foam blast UVD (silicone/silica concentrate foam control agent) from Emerald Performance Materials.

Embodiments of the adhesive composition may contain the de-aerators BYK-500(silicone-free air release additive), BYK-535(silicone-free polymer), or BYK-1791(silicone-free, aromatic-free, polymer-based defoamer) in a loading of 0.01% to 2.5%, or preferably 0.1% to 2.0%, or more preferably 0.25% to 1.5%, based on the weight of the adhesive composition.

Wax

Waxes selected from synthetic waxes, semi-crystalline waxes, petroleum waxes, microcrystalline waxes, paraffin waxes animal waxes, vegetable waxes, carnauba waxes, mineral waxes may be included in embodiments of the adhesive composition. Once dispersed, the wax (when used) must be compatible with other the components in the adhesive composition embodiment to ensure that composition remains stable and will not clog the printhead when the adhesive is applied through an inkjetting process.

For example, embodiments including the carnauba wax Lanco™ 1955 SF (available from Lubrizol) should be present at a loading of 0.02% to 1.0%, preferably 0.05% to 0.5%, or more preferably 0.10% to 0.30%, based on the weight of the adhesive composition. Embodiments may also include, for example, polyethylene wax S-395-N5 (available from Shamrock) in loading of 0.02% to 1.0%, preferably 0.05% to 0.5%, or more preferably 0.10% to 0.30%, based on the weight of the adhesive composition.

Flexographic Applications

Embodiments of the adhesive compositions may be used in flexographic foiling applications by increasing the levels of the inert resins and/or the oligomers to achieve viscosity of about 100-3000 cps and preferably about 400 to 2000 cps.

The inert resins may be one or more acrylic resins, methacrylic resins, acrylate resins, methacrylate resins, urea aldehyde resins, rosin ester resins, cellulose resins, polyester resins, aldehyde resins, epoxy resins, vinyl chloride copolymers, melamine-formaldehyde resins, polyurethane resins, polyimide resins, alkyd resins, and phthalate resins. Of them, more commonly used in adhesive/coating/ink industry are acrylic resins, acrylate resins, methacrylate resins, aldehyde resins, vinyl resins, rosin ester resins, cellulose resin, and hydrocarbon resins.

The inert resins should have a glass transaction temperature (Tg) of −40° C. to 300° C., preferably 10° C. to 150° C., or more preferably 20° C. to 100° C., and a molecular weight of about 2,000 to 300,000 g/mole, preferably about 10,000 to 200,000 g/mole, or more preferably about 20,000 to 100,000 g/mole.

The inert resin can be present in an amount of 0 to 100%, preferably in an amount 50% to 100%, and more preferably in an amount of 80-100%, based on the weight of the resin composition (i.e., the total amount of oligomer and inert resin used in the adhesive formulas).

The total inert resin composition present in the adhesive composition will be about 0 to 45%, preferably 5% to 30%, or more preferably 8% to 20%, based on the weight of the adhesive composition.

Oligomers

The oligomers may be one or more of epoxy (meth)acrylate, polyester (meth)acrylate, polyether (meth)acrylate, and polyurethane (meth)acrylate.

Of the above, the preferred used oligomers are polyurethane acrylates, polyester acrylates, polyether acrylate, and epoxy acrylates which have a molecular weight less than about 100,000 g/mole and a viscosity of less than about 100,000 cps at room temperature. Preferred oligomers are polyurethane acrylates having molecular weight of less than about 75000 g/mole and viscosity of less than about 50000 cps at room temperature. More preferred oligomers are polyurethane acrylates having molecular weight of less than about 20000 g/mole and viscosity of less than 20000 cps at room temperature.

The oligomers included in the adhesive can be a single type of acrylate resin or a combination of two or more types of acrylate resin. They should have a glass transaction temperature (Tg) of about −35° to 250° C., preferably 10° C. to 120° C., or more preferably about 20° C. to 100° C.

The oligomer can be present in an amount of 0 of to 100%, preferably in an amount 50% to 100%, and more preferably in an amount of 80% to 100%, based on the weight of the resin composition (i.e., the total amount of oligomer and inert resin used in the adhesive formulas).

The total low functionality oligomer present in the adhesive composition will be about 0 to 45%, preferably about 5% to 30%, or more preferably about 8% to 20%, based on the weight of the adhesive composition.

EXAMPLES

The following examples are provided for illustrative purposes only and are not to be construed as in any way limiting the claimed subject matter.

Example 1

UV Curable, Heat Activated Ink Let Adhesive (1) Formula and Curing Properties for UV Curable Heat Activated Ink Jet Adhesive Embodiment Many inert resins come in powder or pellet form. For the convenience in adhesive preparation, these resins can be dissolved in suitable monomers to form uniform solutions. The inert resins (30 g of Dianal BR-106 in this example), together with stabilizers (1 g of Genorad 16 in this example), were placed into a 200 ml metal jar containing monofunctional monomers (69 g of BASF Laromer TBCH 105 in this example). The blend was mixed under agitation for about 2-4 hours (1000 rpm-2500 rpm) at 60°-90° C. until a homogeneous resin solution was formed.

The inert resin solution used was 30% Dianal BR-106 resin solution. The Dianal BR-106 resin itself is a n-butyl methacrylate copolymer (supplied by DAI) having a molecular weight of 60,000 and a glass transaction temperature (Tg) of 58° C.

UV curable adhesive was prepared according to the formula given in Table 1 below. All amounts were in weight percentage (wt %) unless specified otherwise. Each of the components in the formula was placed in a 100 ml plastic container. The container was sealed with a lid and then mixed at 2500 rpm until a homogenous adhesive solution was formed. The homogenous adhesive solution was filtered with a 0.5 micro filter remove any undissolved particles. The solution viscosity was recorded at 25° C. and 45° C., respectively, using a Brookfield DV-E viscomer from Polystat Cole-Parmer.

The composition adhesive was then printed onto a two-side coated paper (Productolith C2S), with a Mayer rod #8 to deliver coat weight of 20 gsm (grams per square meter). The printed adhesive was UV cured through an AMS UV curing unit (provided by Air Motion System) equipped with a 300 w/inch UV lamp. The print was evaluated for its surface tack by finger touch, both immediately and 30 minutes after cure. The dose required for a surface tack-free cured print was recorded.

The adhesion of the cured film to the paper substrate was assessed with a 810 tape test which is a test of adhesion that is well-recognized in the ink coating field. The results are reported below as "pass" or "fail", in which "pass" indicates no adhesive removal from the substrate and "fail" indicates greater than 10% adhesive removal from the substrate.

As shown in Table 2, the results demonstrate that the inventive adhesion is cured to substantially surface tack-free upon exposure to the UV radiation having a dose of 350 mj/cm2. The cured surface becomes tack-free within 30 minutes. The cured film presents an acceptable 810 tape adhesion.

TABLE 1

| UV curable, heat activated ink jet adhesive component | | |
|---|---|---|
| UV curable adhesive formula | | % |
| Dianal BR-106 resin TBCH solution (30%) (methacrylic resin) | methacrylate resin having a Tg of 58° C. | 12.00 |
| BASF Laromer TBCH 105 (resin) | t-butyl cyclohexyl acrylate have a Tg of 84° C. | 73.40 |
| IGM Omnirad 481 (photoinitiator) | 1-hydroxycyclohexyl-phenyl ketone | 7.60 |
| IGM Omnirad BP (photoinitiator) | benzophenone | 5.00 |
| Byk-535 (air release additive) | silicone-free de-aerator | 1.00 |
| Trilogy RadAdd 1116 (silicone) | silicones flow/levelling agent | 1.00 |
| Total (%) | | 100.00 |
| Viscosity (cps) at 25° C. | | 23.78 |
| Viscosity at (cps) 45° C. | | 11.82 |

TABLE 2

| Curing properties of the UV curable, heat activated ink jet adhesive | |
| --- | --- |
| Doses required for a surface-tack free (mJ/cm$^2$ for total UV-a, UV-b, and UV-c) | 350 |
| Immediate surface tackiness for cure | surface substantially tack-free |
| Surface tackiness 30 minute post cure | tack-free |
| 810 tape adhesion test | pass |

If tested, it would be found that immediate tack-free surfaces can be achieved by using or incorporating other inert resins, or oligomers, or monomers, or additives within the teaching of the specification above, or by adjusting the ratios between these components, also within the teaching of the specification above. If adjustments were made in the composition, it would be found that the radiation dose required for the immediate tack-free surface can be reduced to 50 mj/cm2 (total UV-a, UV-b, and UV-c).

A substrate (paper) bearing a cured, surface tack-free adhesive as prepared above was used to conduct the foiling application testing.

(2) Foil Transfer Properties in Lab Test for UV Curable Heat Activated Ink Jet Adhesive The foil transfer tested related to an "off-line" hot foiling application. The "off-line" hot foiling was simulated by a lab operation that involved the use of a SRL-2700 plus laminator (supplied by Sircle Corp). First a piece of cold foil CFR-4T035 (from ITW) was placed on top of the paper substrate bearing with the cured, surface tack-free adhesive. Then, this sandwiched structure (foil/cured adhesive/paper) was fed into the SRL-2700 plus laminator and passed through the nip formed by an impression roll and a heat roll. In the nip the foil was pressed into firm contact with the substrate and the foil transfer occurred under the impression (around 5 psi) and heat (about 104° C./220° F.). The foiling quality was acceptable under the corresponding test conditions. The transferred foil presented an acceptable 810 tape adhesion property.

When a hot foil (SFK-1067 from ITW) was applied under the same conditions, a good foil transfer quality was achieved as well. The transferred hot foil also exhibited a good 810 tape adhesion property.

(3) Jetting, Curing and Foil Transfer Properties Through Inkjet Process for UV Curable Heat Activated Ink Jet Adhesive The above UV curable, heat activated inkjet adhesive was assessed for its jetting ability and curing properties with a SLED inkjet printing unit (provided by Inx International). This unit was equipped with a Xaar1002 printhead (3 mm distance from the substrates to be printed) and a 100 w/in UV lamp. The printer fires all nozzles at 5500 HZ to get a maximum droplet size (42 pico-liter). The adhesive was jetted trouble free under all test conditions which including different temperatures (25° C., 45° C., and 60° C.) and different printing resolutions (360 dpi x 1080 dpi, 360 dpi×720 dpi, and 360 dpi×360 dpi).

When the UV adhesive was printed on paper (TT9502 thermal transfer paper supplied by Mactac) in a desired image pattern with a 360 dpi×1080 dpi resolution, was cured and reached a substantially tack-free surface state when exposed to the UV radiation applied (2 passes under a 100 w/inch lamp). The image pattern included fine lines, square solids, round solids, types, and company logos. The cured adhesive formed a raised image on the substrate, with a relief depth of around 15-20 micron.

The hot foiling was conducted using a SRL-2700 laminator (supplied by Sircle Corp). First a cold foil (CFR-4T035 from ITW) was placed on top of the paper bearing the cured, surface tack-free adhesive. Then, the sandwiched structure (foil/cured adhesive/paper) was fed into the laminator and passed through the nip located between an impression roll (around 5 psi) and a heat roll (around 104° C./220° F.).

Then, a hot foil (SFK-1067 from ITW) was applied under the same conditions.

An acceptable image quality was created for the transferred foils (both cold foil and hot foil). The "raised" sharp image was available in both solid area and fine type areas. The transferred foil patterns also had an acceptable 810 tape adhesion property.

Example 2

LED Curable, Heat Activated Ink Jet Adhesive (1) Formula and Curing Properties for LED Curable Heat Activated Ink Jet Adhesive The LED curable, hot activated adhesive was prepared according to the formula shown in Table 3. This also involved the use of the inert resin Dianal BR-106. The method used in preparing the LED curable, heat activated adhesive was the same as it was used in preparing the UV curable, heat activated adhesive. The adhesive viscosity was recorded at 25° C. and 45° C., respectively, using a Brookfield DV-E viscometer from Polystat Cole-Parmer.

The LED curable adhesive was then printed, with a Mayer rod #8 bar, onto a two-side coated paper (Productolith C2S). The printed adhesive was LED cured through an AMS LED curing unit (provided by Air Motion System) equipped with a 17 w/cm LED lamp. The print was then evaluated for surface tack by finger touch, both immediately and 30 minutes after cure. The dose required for a surface-tack free cured print was recorded.

The adhesion of the cured film to the paper substrate was assessed with the 810 tape test. The results were reported as "pass" or "fail", in which "pass" corresponds to a no adhesive removal from the substrate and "fail" corresponds to greater than 10% adhesive removal from the substrate.

The results (Table 4) revealed that a dose of 500 mj/cm$^2$ in long actinic wave bands (mainly from UV-A2) is necessary for the LED curable inkjet adhesive to get fully cure. The fully cured adhesive provided an acceptable 810 tape adhesion.

TABLE 3

| LED curable, heat activated ink jet adhesive component | | |
| --- | --- | --- |
| LED curable adhesive formula | | % |
| Dianal BR-106 resin TBCH solution (30%) | methacrylate resin having a Tg of 58 C. | 4.00 |
| BASF Laromer TBCH 105 | t-butyl cyclohexyl acrylate having a Tg of 84 C. | 76.00 |
| Byk-535 | silicone-free de-aerator | 1.00 |
| Trilogy RadAdd 1116 | silicones flow/levelling agent | 1.00 |
| IGM Irgacure 819 | bis(2,4,6-trimethylbenzoyl)-phenylphosphineoxide | 1.50 |
| IGM TPO | 2,4,6-trimethylbenzoyldiphenyl-phosphine oxide | 4.50 |
| IGM EHA | 2-ethylhexyl-4-dimethylaminobenzoate | 2.00 |

TABLE 3-continued

LED curable, heat activated ink jet adhesive component

| LED curable adhesive formula | | % |
|---|---|---|
| Rahn Genopol BP2 | Polymeric benzophenone derivative | 4.00 |
| Rahn Genopol AB2 | Polymeric aminobenzoate derivative | 2.00 |
| IGM Omnipol TX | Diester of carboxymethoxy thioxanthone and polytetramethyleneglycol 250. Acts as a polymeric photo initiator. | 2.50 |
| IGM Irgacure 369 | 2-benzyl-2-(dimethylamino)-4'-morpholinobutyrophenone | 1.30 |
| Rahn Genorad 16 | polymerisation inhibitor in acrylic acid ester | 0.20 |
| Total(%) | | 100.00 |
| Viscosity (cps) at 25° C. | | 23.93 |
| Viscosity (cps) at 45° C. | | 10.68 |

TABLE 4

Curing properties of the UV curable, heat activated inkjet adhesive

| | Jet-24D |
|---|---|
| Dose required for a tack-free surface (mJ/cm2 for total UV-A2) | 500 |
| Immediate surface tackiness after cure | substantially tack-free surface |
| Surface tackiness 30 minute post-cure | tack-free |
| 810 tape adhesion test | pass |

If tested, it would be found that an immediate tack-free surface can be achievable by using or incorporating other inert resins, or oligomers, or monomers, or additives, within the teaching of the specification above, or by adjusting the ratios between these components, also within the teaching of the specification above. If tested, it would also be found that the radiation dose required for the achieving surface tack-free can be further reduced to 100 mj/cm2 (total UV-A2).

The substrate bearing the cured, surface tack-free adhesive was used to conduct the foiling application described in below.

(2) Foil Transfer Properties in Lab Test for LED Curable Heat Activated Ink Jet Adhesive Foil transfer was conducted using a SRL-2700 laminator (supplied by Sircle Corp). This was a simulation of die-less hot foiling as the foil transfer was realized through a heating roller and an impression roller provided by the laminator. The pressure of the impression roller was preset at about 5 psi and the temperatures of the heating roller was adjustable within the range 140° F. to 300° F.

A cold foil (CFR-4T035 from ITW) was placed on top of a paper substrate bearing with the cured adhesive. Then, this sandwiched structure (foil/cured adhesive/paper) was fed into the laminator and passed through the nip located between an impression roll and a heat roll. In this nip, the foil was pressed into confirm contact with the substrate and foil transfer occurred under the impression pressure (around 5 psi) and heat (around 104° C./or 220° F.). The foiling quality was acceptable under the corresponding test conditions. The transferred foil presented a good 810 tape adhesion property.

Following the cold foil transfer test, a hot foil (SFK-1067 from ITW) was applied under the same condition. A good foil transfer quality was obtained as well for the hot foil. The hot foil also exhibited a good 810 tape adhesion property.

(3) Jetting, Curing and Foil Transfer Properties Through Inkjet Process for the LED Curable Heat Activated Ink Jet Adhesive LED curable, heat activated inkjet adhesive was assessed for its jetting ability and curing properties with a SLED printing unit from Inx International. This unit was equipped with a Xaar1002 printhead (3 mm distance from the substrates to be printed) and a 16 w/cm Phoseon LED lamp (10 mm distance from the substrates).

The printer fired all nozzles at 5500 HZ to get maximum droplet size (42 pico-liter). The adhesive was jettable in all test conditions, including room temperature 25° C. jetting, 45° C. jetting, and 60° C. jetting. The coat weight could be adjusted by adapting different printing resolutions, for example, a 360 dpi×1080 dpi resolution, a 300 dpi×720 dpi resolution, and a 360 dpi×360 dpi resolution.

When the LED adhesive was printed on paper (TT9502 thermal transfer paper supplied by Mactac) in a desired image pattern with 360 dpi×1080 dpi resolution, it could be cured with one pass of exposure to reach a substantially tack-free surface when 75% power of the LED lamp (16 w/cm) was applied. The image pattern included fine lines, square solids, round solids, types, and company logos.

Hot foiling was conducted using a SRL-2700 laminator (supplied by Sircle Corp). First a cold foil (CFR-4T035 from ITW) was placed on top of the paper substrate (TT9502 thermal transfer paper supplied by Mactac) bearing the cured, surface tack-free adhesive. Then, the sandwiched structure (foil/cured adhesive/paper) was fed into the laminator and passed through the nip located between an impression roll (about 5 psi) and a heat roll (about 104° C./or 220° F.).

An acceptable image quality was achieved for the die-less hot foiling. The "raised-like" image patterns imparted by the cold foil and hot foil were both sharp and clean. The foiling image presented the desired 810 tape adhesion property.

Example 3

EB Curable, Heat Activated Ink Let Adhesive (1) Formula and Curing Properties for EB Curable Heat Activated Ink Jet Adhesive EB curable, heat activated adhesive in accordance with embodiments of the invention was prepared according to the formula reported in Table 3 below. The method used in preparing the LED curable, heat activated adhesive was the same as was used in preparing UV curable, heat activated adhesive above. The adhesive viscosity was recorded at 25° C. and 45° C., respectively, using a Brookfield DV-E viscomer from Polystat Cole-Parmer.

The EB curable adhesives were then printed, with a Mayer rod #8 bar, onto a two-side coated paper (Productolith C2S). The printed adhesive was cured through an E-Beam unit (provided by Comet Technologies USA Inc.). The air gap, the electrical voltage, the curing speed was set as 10 mm, 125 Kv, and 50 fpm, respectively. The oxygen concentration in the curing chamber was maintained 200 ppm with a well-controlled nitrogen flow. The cured print was then evaluated for its surface tack by finger touch, both immediately and 30 minutes after cure. The dose required for a tack-free surface cured print was recorded.

The adhesion of the cured film to the paper substrate was assessed with the well-known 810 tape test. The results were given as "pass" or "fail", where "pass" corresponds to a no adhesive removal from the substrate and "fail" corresponds to greater than 10% adhesive removal from the substrate.

As shown in Table 6, the results demonstrated that the EB curable adhesive was fully cured at a radiation dose of 30 KGy. The fully cured adhesive film had a good 810 tape adhesion property.

TABLE 5

EB curable, heat activated ink jet adhesive component

| EB curable adhesive formula | | % |
|---|---|---|
| Dianal BR-106 resin TBCH solution (30%) | methacrylate resin having a Tg of 58° C. | 16.00 |
| BASF Laromer TBCH 105 | t-butyl cyclohexyl acrylate have a Tg of 84° C. | 82.00 |
| Byk-535 | silicone-free de-aerator | 1.00 |
| Trilogy RadAdd 1116 | silicones flow/levelling agent | 1.00 |
| Total (%) | | 100.00 |
| Viscosity (cps) at 25° C. | | 28.17 |
| Viscosity at (cps) at 45° C. | | 13.86 |

TABLE 6

Curing properties of the EB curable, heat activated ink jet adhesive

| Doses required for a surface-tack free (KGy) | 30 |
|---|---|
| Surface tackiness upon immediate cure | substantially tack-free surface |
| Surface tackiness upon for 30 minute post cure | tack-free |
| 810 tape adhesion test | pass |

If tested, it would be found that an immediate tack-surface free is achievable by using or incorporating other inert resins, oligomers, monomers, and additives within the teaching of the specification above, and by adjusting the ratios between these components, also within the teaching of the specification above. By making appropriate formulation changes within the teaching above, it would be found that the radiation dose required for the achievement of surface tack-free can be further reduced to 10 KGy).

A substrate bearing the cured, surface tack-free adhesive above was used to conduct a foiling application.

(2) Foil Transfer Properties in Lab Test for the EB Curable Heat Activated Ink Jet Adhesive Foil transfer was conducted using a SRL-2700 plus laminator (supplied by Sircle Corp). A cold foil CFR-4T035 from ITW) was placed on top of the paper substrate bearing the cured, surface tack-free adhesive. Then, the sandwiched structure (foil/cured adhesive/paper) was fed into the laminator and passed through the nip located in between an impression roll and a heat roll. The foil transfer was conducted under the impression pressure (about 5 psi) and heat (about 104° C./ or 220° F.). The foiling quality was acceptable under the corresponding test conditions. The transferred foil presented a good 810 tape adhesion property.

Following the cold foil, a hot foil (SFK-1067 from ITW) was also applied under the same conditions. A good foil transfer quality for hot foil was achieved as well. The hot foil transferred to the paper substrate also exhibited a good 810 tape adhesion property.

(3) Jetting, curing and foil transfer properties through inkjet process for the EB curable heat activated ink jet adhesive If the jetting ability and curing properties of the EB curable composition above were assessed along the lines described for the UV and LED curable compositions, it would be found that acceptable image quality could be achieved for die-less hot foiling.

The use of the terms "a" and "an" and "the" and similar referents in the context of describing embodiments of the invention including in the context of the following claims are to be construed to cover both the singular and the plural, unless otherwise indicated or clearly contradicted by context. Recitation of ranges of values are intended to serve as a shorthand method of referring individually to each separate value falling within the range, unless otherwise indicated, and each separate value is incorporated into the specification as if it were individually recited herein. All methods described herein can be performed in any suitable order unless otherwise indicated or otherwise clearly contradicted by context. The use of any and all examples, or exemplary is intended to help illuminate embodiments of the invention and not to establish a limitation on the scope of the invention unless otherwise claimed. No language in the specification should be construed as indicating any non-claimed element as essential to the practice of embodiments of the invention. It should be understood that the illustrated embodiments are exemplary only, and should not be taken as limiting the scope of the invention.

What is claimed is:

1. An adhesive composition comprising:
   a monomer component comprising one or more free-radical curing monofunctional monomers that cure upon exposure to EB radiation; and
   an oligomer/resin component comprising one or more oligomers, one or more inert thermoplastic resins, or a combination thereof, the oligomer/resin component being soluble in the one or more monofunctional monomers,
   wherein the adhesive composition forms a hardened tack-free solid at room temperature when cured upon exposure to EB radiation, and wherein the cured adhesive composition is rendered tacky upon exposure to heat and pressure.

2. The adhesive composition of claim 1, wherein the monomer component further comprises bifunctional and/or trifunctional free-radical curing monomers at a level of no more than about 20% by weight of the monomer component.

3. The adhesive composition of claim 1, wherein the monomer component further comprises including bifunctional and/or trifunctional free-radical curing monomers at a level of no more than about 10% by weight of the monomer component.

4. The adhesive composition of claim 1, wherein the oligomer/resin component comprises exclusively one or more inert thermoplastic resins.

5. The adhesive composition of claim 1, wherein the oligomer/resin component comprises exclusively one or more oligomers.

6. The adhesive composition of claim 1, wherein the oligomer/resin component comprises a combination of one or more oligomers and one or more inert thermoplastic resins.

7. The adhesive composition of claim 1, wherein the one or more thermoplastic resins and one or more oligomers have a glass transition temperature $T_g$ within 40% of the glass transition temperature of the one or more free-radical curing monofunctional monomers.

8. The adhesive composition of claim 1, wherein the one or more thermoplastic resins and one or more oligomers have a glass transition temperature $T_g$ within 10% of the glass transition temperature of the one or more free-radical curing monofunctional monomers.

9. The adhesive composition of claim 1, wherein the thermoplastic resins and oligomers are selected to achieve, in combination with the other ingredients of the composition, a glass transition temperature $T_g$ of the composition in the range of about 20-100° C.

10. The adhesive composition of claim 1, wherein the inert thermoplastic resins have a molecular weight in the range of about 800 g/mole to 200,000 g/mole and are selected from the group consisting of rosin ester resins, cellulose resins, polyester resins, aldehyde resins, epoxy resins, acrylic resins, methacrylic resins, acrylate resins, methacrylate resins, urea aldehyde resins, vinyl chloride copolymers, melamine-formaldehyde resins, polyurethane resins, polyimide resins, alkyd resins, and phthalate resins.

11. The adhesive composition of claim 1, wherein the inert resin is present in the composition at a level of about 1 to 8% by weight of the adhesive composition and the one or more oligomers are present at a level of about 1 to 8% by weight of the adhesive composition.

12. The adhesive composition of claim 1, wherein the one or more thermoplastic resins have a glass transition temperature $T_g$ of about –20° C. to 250° C. and a molecular weight of about 800 to 60,000 g/mole.

13. The adhesive composition of claim 1, wherein the one or more oligomers have a glass transition temperature $T_g$ of about –45° to 175° C., a molecular weight less than about 100,000 g/mole, and a viscosity less than about 100,000 cps.

14. The adhesive composition of claim 1, wherein the oligomers are selected from the group consisting of epoxy (meth)acrylate, polyester (meth)acrylate, polyether (meth)acrylate, and polyurethane (meth)acrylate.

15. The adhesive composition of claim 1 wherein the monofunctional monomers are selected from the group consisting of aliphatic mono(meth)acrylate, aromatic mono(meth)acrylate, alkoxylated (meth)acrylate, tetrahydrofurfuryl (meth)acrylate, alkoxylated tetrahydrofurfuryl (meth)acrylate, mono-acrylic, N-vinyl compound, and acrylamide compound.

16. The adhesive composition of claim 3, wherein the difunctional monomers are selected from the group consisting of aliphatic di-(meth) acrylate, aromatic di-(meth)acrylate, alkoxylated aliphatic di-(meth)acrylate, alkoxylated aromatic di-(meth)acrylate, glycol di-(methac)acrylate, cyclohexane dimethanol di-(meth)acrylate, and hybrid monomers.

17. The adhesive composition of claim 3, wherein the trifunctional monomers are selected from the group consisting of trimethylolpropane trimethacrylate, trimethylolpropane triacrylate, tris (2-hydroxy ethyl) isocyanurate triacrylate, pentaerythritol triacrylate, ethoxylated (3) trimethylolpropane triacrylate, propoxylated (6) trimethylolpropane triacrylate, and propoxylated (3) glyceryl triacrylate.

18. The adhesive composition claim 1, wherein the one or more monomers have molecular weights less than about 1000 g/mole and viscosities less than about 100 cps.

19. The adhesive composition of claim 1, wherein the one or more monomers are present at a level of about 45 to 95% by weight based on the weight of the adhesive composition.

20. The adhesive composition of claim 1, wherein the one or more monomers are present at a level of about 60 to 80% by weight based on the weight of the adhesive composition.

21. The adhesive composition of claim 1, wherein the one or more monomers comprise isobornyl acrylate and/or T-butyl cyclohexyl acrylate.

22. The adhesive composition of claim 1, further comprising one or more of polymerization inhibitors, stabilizers, wetting/flow agents, de-aerators, defoamers, and waxes.

23. The adhesive composition of claim 1, wherein the monofunctional monomers are present at a level of about 45-95% by weight of the adhesive composition, the inert resins are present at a level up to about 10% by weight of the adhesive composition, and the oligomers are present at a level up to about 10% by weight of the adhesive composition.

24. A method of transferring foil to a substrate in an image pattern comprising:
   providing a foil bearing web;
   providing a substrate for receiving foil from the web;
   supplying an adhesive composition comprising one or more free-radical curing monofunctional monomers, an oligomer/resin composition component comprising one or more oligomers and one or more inert thermoplastic resins which are soluble in the one or more monofunctional monomers, and where required to cure the composition one or more free radical photoinitiators;
   applying the adhesive composition to the substrate in an image pattern using an inkjet printhead;
   applying radiation to the image pattern to cure the adhesive composition to a hardened, tack-free state;
   positioning the substrate bearing the cured image pattern against the foil of the foil bearing web and applying heat and pressure to render the adhesive composition tacky and transfer foil onto the image pattern.

* * * * *

UNITED STATES PATENT AND TRADEMARK OFFICE
CERTIFICATE OF CORRECTION

| | |
|---|---|
| PATENT NO. | : 11,518,895 B2 |
| APPLICATION NO. | : 17/151949 |
| DATED | : December 6, 2022 |
| INVENTOR(S) | : Jonathan Graunke et al. |

It is certified that error appears in the above-identified patent and that said Letters Patent is hereby corrected as shown below:

In the Claims

On Column 22, Claim 3, Line 46, replace "monomer component further comprises including bifunctional" with – monomer component further comprises bifunctional –

Signed and Sealed this
Twenty-sixth Day of March, 2024

Katherine Kelly Vidal
*Director of the United States Patent and Trademark Office*